(12) United States Patent
Hamilton (10) Patent No.: US 11,414,025 B1
(45) Date of Patent: Aug. 16, 2022

(54) OBJECT RETAINING SYSTEM FOR VEHICLES

(71) Applicant: Leslie Ronald Hamilton, Monterey, CA (US)

(72) Inventor: Leslie Ronald Hamilton, Monterey, CA (US)

( * ) Notice: Subject to any disclaimer, the term of this patent is extended or adjusted under 35 U.S.C. 154(b) by 0 days.

(21) Appl. No.: 17/452,639

(22) Filed: Oct. 28, 2021

(51) Int. Cl.
*B60R 11/02* (2006.01)
*B60R 7/04* (2006.01)
*B60R 11/00* (2006.01)

(52) U.S. Cl.
CPC .......... *B60R 11/0252* (2013.01); *B60R 7/043* (2013.01); *B60R 11/0241* (2013.01); *B60R 2011/0012* (2013.01); *B60R 2011/0294* (2013.01)

(58) Field of Classification Search
CPC . B60R 11/0252; B60R 11/0241; B60R 7/043; B60R 2011/0012; B60R 2011/0029; B60R 2011/0294; B60N 3/102; B60N 3/103
See application file for complete search history.

(56) References Cited

U.S. PATENT DOCUMENTS

| | | | |
|---|---|---|---|
| 5,052,649 A * | 10/1991 | Hunnicutt | A47G 23/0225 248/311.2 |
| 5,673,628 A * | 10/1997 | Boos | B60N 3/001 108/138 |
| 5,676,340 A | 10/1997 | Ruhnau | |
| 5,695,162 A | 12/1997 | DiCastro | |
| 6,123,220 A | 9/2000 | Williams | |
| 6,189,755 B1 | 2/2001 | Wakefield | |
| 6,315,153 B1 | 11/2001 | Osborn | |
| 6,478,372 B1 | 11/2002 | Lemmeyer et al. | |
| 6,511,031 B2 | 1/2003 | Lin | |
| 7,284,737 B2 | 10/2007 | Kane | |
| 7,318,616 B1 * | 1/2008 | Bradley | B60N 2/206 296/37.15 |
| 7,905,456 B2 * | 3/2011 | Gough | F16M 11/40 248/160 |
| 7,946,542 B1 * | 5/2011 | Chapman | F16M 11/2014 248/122.1 |
| 8,066,148 B2 | 11/2011 | Garahan | |
| 9,789,826 B2 * | 10/2017 | Itou | B60N 2/06 |
| 9,819,377 B1 | 11/2017 | Singh et al. | |
| 10,377,284 B2 * | 8/2019 | Prezecki, II | B60N 2/793 |
| 10,549,672 B2 | 2/2020 | Matsumoto et al. | |
| 10,933,815 B1 * | 3/2021 | Khubani | B60R 11/0241 |

(Continued)

FOREIGN PATENT DOCUMENTS

| | | | | |
|---|---|---|---|---|
| CN | 213262087 U | * | 5/2021 | |
| DE | 20202769 U1 | * | 7/2011 | ......... B60R 11/0252 |

*Primary Examiner* — Jason S Morrow
(74) *Attorney, Agent, or Firm* — Dunlap Bennett & Ludwig, PLLC (57) ABSTRACT

An object retaining system adapted to operatively associate with an intrinsic, host seat track of a vehicle for retaining devices, containers, or the like within the cabin of the vehicle. The object retaining system may utilize a track arm to slidably engage the intrinsic host seat track, and a locking mechanism may be employed to secure such engagement. Selective adjustment of the elevation and location of the retaining object is also contemplated herein with adjustable height portions and pivotable connections disclosed.

20 Claims, 5 Drawing Sheets

(56) References Cited

U.S. PATENT DOCUMENTS

| | | |
|---|---|---|
| 2002/0145096 A1 | 10/2002 | Eubanks |
| 2004/0021049 A1 | 2/2004 | Payne et al. |
| 2007/0145219 A1* | 6/2007 | Lin .................. F16M 11/14 |
| | | 248/274.1 |
| 2010/0051663 A1 | 3/2010 | Carpenter |
| 2012/0097724 A1 | 4/2012 | Standfest et al. |

* cited by examiner

OBJECT RETAINING SYSTEM FOR VEHICLES

BACKGROUND OF THE INVENTION

The present invention relates to object retainers and more particularly, to an object retaining system for the interior of vehicles that is non-permanent and selectively adjustable retainer for objects such as smart devices and beverage containers, wherein the object retaining system operatively associates with an intrinsic seat track of the vehicle.

Current solutions for retaining beverage container holders or mobile devices in a vehicle either require commandeering the host beverage holder or an intrinsic flat ferrous or glass surface of the vehicle. The problem being that using the intrinsic beverage holder ironically reduces the total number of cup holders available, while using an intrinsic flat ferrous or glass surface lessens the aesthetic appeal of such surface as well as typically requires the holder to project into the elbow room of the driver and/or passengers. Additionally in more modern vehicles there are no suitable flat ferrous surfaces available.

In some cases, the vehicle, such as a classic sports car, may have no intrinsic beverage holder and, although beverage holders can be installed in such cases, these generally require a modification to the vehicle whose appeal partly is attributed to its compact, streamlined, original, and/or spartan interior. For similar reasons, mounting an object holder to an intrinsic flat ferrous or glass surface for such vehicle may result in an inconvenience in such tight spaces.

Other solutions require expensive high-strength magnets or attachment to a window or air vent, and these solutions run the risk of permanently marking the vehicle's interior. Moreover, some solutions that are available for mobile devices but are not sufficiently stable for beverage holders.

Accordingly, there is a need for a non-permanent, selectively adjustable retaining system for beverage containers and mobile devices that operatively associates with the seat track of a vehicle.

The present invention attaches securely to the target vehicle using a customed track arm inserted into one of the seat track/runner slides for securely retaining the beverage or device holder in place without permanent changing or marking the vehicle, while also not commandeering the host beverage holder or flat elevated surface (and thus elbow room) of the vehicle. The device embodied in the present invention can be manufactured inexpensively using straightforward injection molding processes or additive manufacturing processes.

In other words, the disclosure provides a method to temporarily adding beverage holders or mobile apparatus holders without modification to the vehicle or requiring the presence of ferrous or glass surfaces. The present invention uses the intrinsic seat tracks/rails of the vehicle to secure the retaining system to the vehicle without vehicle modifications. These seat tracks are adjacent the floor of the vehicle, and so the presence of the present invention does not consumer elbow room either.

In sum, the present invention provides a stable and sturdy solution that can be quickly installed and uninstalled from the mobile vehicle/appliance, wherein the disclosure also does not rely on the availability of a convenient ferrous surface or glass surfaces, and the innovation also does not risk marking the host vehicle.

SUMMARY OF THE INVENTION

In one aspect of the present invention, an object retaining system for an interior of a vehicle, the vehicle comprising a seat track, the system provides a track adaptor having a track arm dimensioned and adapted to slidably engage the seat track and a base adapted to support retention of an object.

In another aspect of the present invention, the object retaining system include wherein the track arm extends in a first plane and the object is supported in a second plane, wherein the first and second planes are out of plane, wherein the first and second plane are approximately orthogonal relative to each other; and further including an optional elevation adjustor extending from the base in an elevation direction approximately orthogonal relative to a track direction of a proximal end of the track arm, wherein the elevation adjustor is selectively movable between a retracted position and an extended position in the elevation direction, wherein the elevation adjustor comprises a first adjustor portion and a second adjustor portion, wherein the second adjustor portion is selectively movable in the elevation direction relative to the first adjustor portion; and further including the following: a locking element to position the elevation adjustor between an unlocked position and a locked position, preventing movement in the elevation direction; a cap dimensioned to operatively associated with an upper portion of the elevation adjustor in such a way that the cap can be rotated about a longitudinal axis of the elevation adjustor; a pivotable connection along the cap, wherein the pivotable connection is pivotable about an axis of rotation orthogonal to said longitudinal axis; and an object retainer associated with the pivotable connection, wherein the object retainer is dimensioned to support retention of said object.

In yet another aspect of the present invention, the object retaining device the object retainer associated directly with the base, wherein the object retainer is dimensioned and adapted for the retention of said object, wherein the object retainer is a sleeve dimensioned to retain a tapered cylindrical object, and wherein the object retainer is the sleeve has a plurality of holes.

In certain aspects of the present invention, a distal end of the track arm includes an arcuate portion, wherein the arcuate portion has a curvature defined by a range of approximately one to two radians.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides for an object retaining system adapted to operatively associate with an intrinsic, host seat track of a vehicle for retaining device, containers, or the like within the cabin of the vehicle without using other intrinsic elements of the vehicle, thereby minimizing negative impact on the aesthetic, functionality, and occupant space of the vehicle's interior. The object retaining system may utilize a track arm to slidably engage the intrinsic host seat track. The object retaining system may include a locking mechanism for the track arm. Selective adjustment of the elevation and location of the retaining object is also contemplated herein with adjustable height portions and pivotable connections being options for the object retaining system. The invention also increases road safety as the object is retained in known location and not rolling loose with the vehicle interior and distracting the driver.

Referring to FIGS. 1 through 10, the present invention may include an object retaining system 100 having a plurality of configurations for retaining containers, smart devices, and other objects. The vehicular retaining system 100 may include a track adaptor 10 for operatively associating with an intrinsic/host seat runner or seat track 34 for the vehicle involved. Vehicles typically include at least one seat assembly that is movable in a fore-aft direction relative to a car floor 36 of the vehicle via the seat track 34 so that a user can adjust the position of the respective seat assembly.

Figure 4:
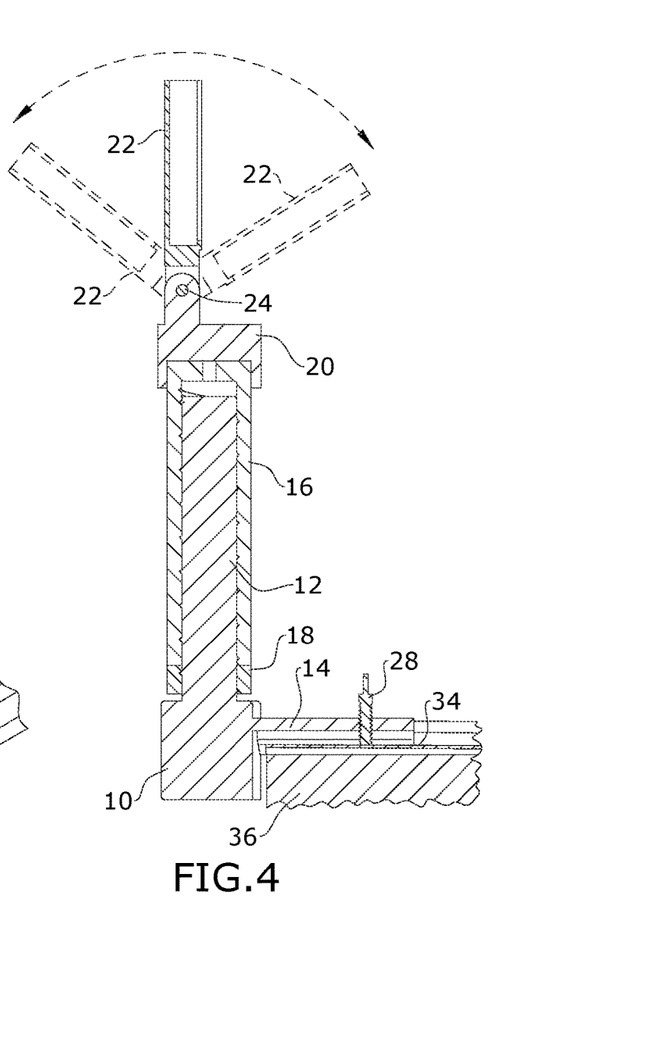
FIG. 4 is a section view of an exemplary embodiment of the present invention, illustrating the pivotability along said axis of rotation.
Figure 5:
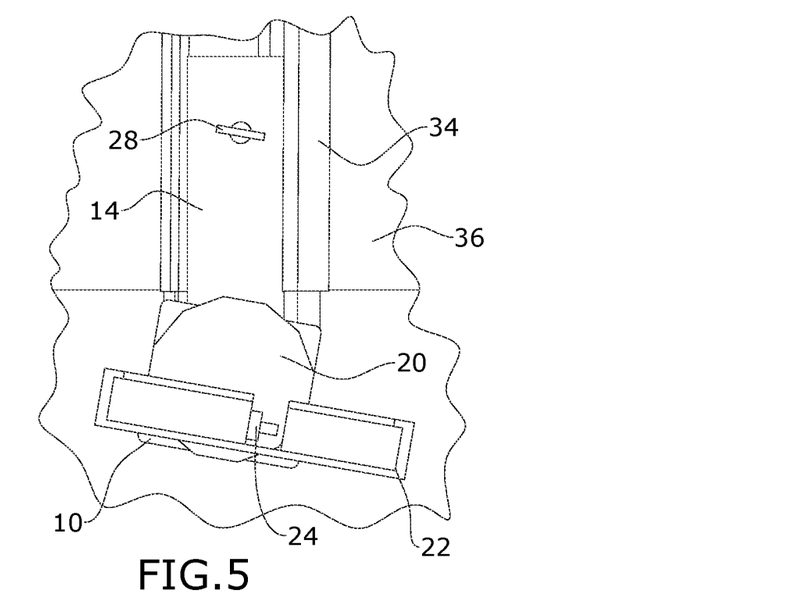
FIG. 5 is a detailed top plan view of an exemplary embodiment of the present invention.

The track adaptor 10 provides a track arm 14 dimensioned and adapted to slide along said seat track 34. It should be understood that through all the illustrations show the track arm sliding inside the seat track some designs may slide outside or alongside the seat track to suit the geometry or for increased rigidity. The track arm 14 may extend from the track adaptor 10 in a first direction. The track arm 14 may have sidewalls along its body so as to operatively slide between the sidewalls of the seat track 34. The track arm 14 may have a locking mechanism 28. The locking mechanism 28 may include a threaded hole through an upper portion of the body of the track arm 14, wherein a locking fastener, such as a thumb screw, is dimensioned to engage the seat track 34 through the hole, as illustrated in FIG. 4, thereby locking the track arm 14 to the seat track 34, preventing slidable movement of the track arm 14 relative to the seat track 34.

Figure 1:
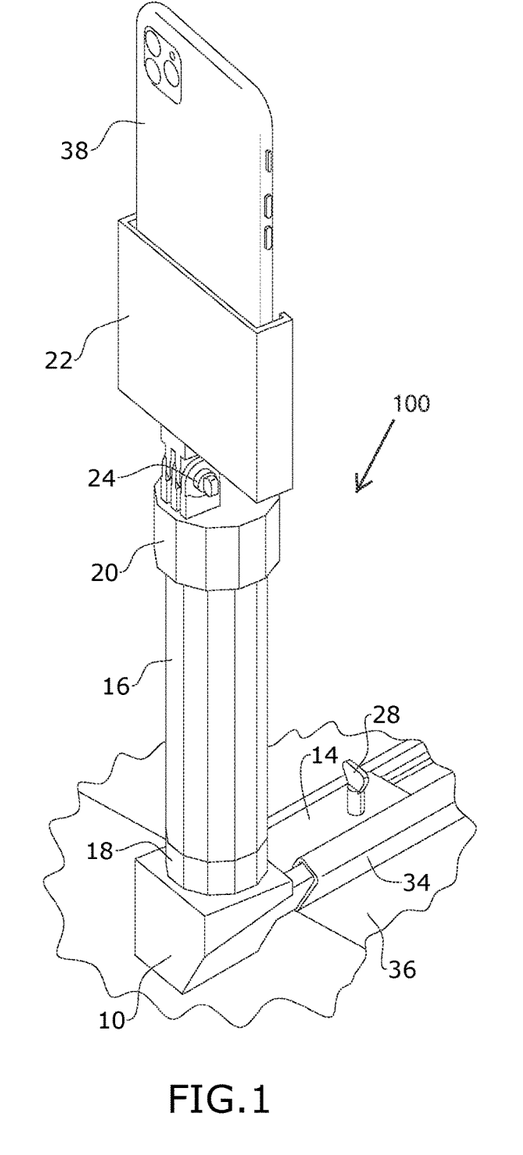
FIG. 1 is a perspective view of an exemplary embodiment of the present invention in a device configuration, shown in a used condition.
Figure 2:
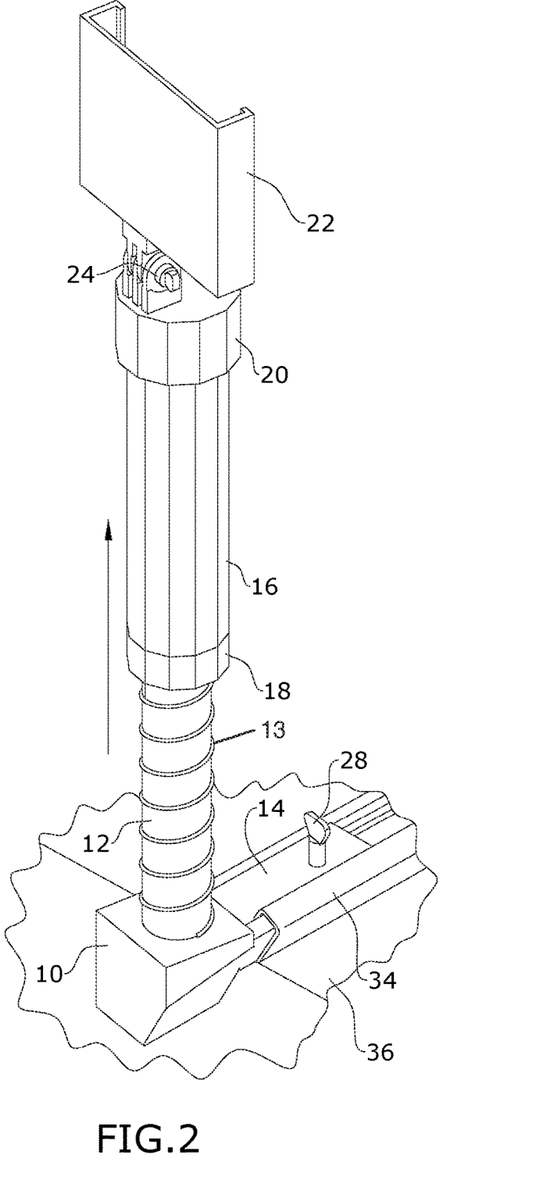
FIG. 2 is a perspective view of an exemplary embodiment of the present invention, illustrating the selective elevation adjustability.

The track adaptor 10 may include a first adjustor portion 12 extending in a second direction. The first and second directions may be approximately perpendicular relative to each other. The first adjustor portion 12 may be cylindrical with external threading 13. A second adjustor portion 16 may be dimensioned and adapted to operatively associate with the first adjustor portion 12 in such a way that the second adjustor portion 16 may move colinearly relative to the first adjustor portion 12, and thus vertically relative to the track adaptor 10, between extended and retracted positions. The retracted position is shown in FIG. 1, while movement to and from one of a plurality of extended positioned is shown in FIG. 2. In certain embodiments, the second adjustor portion 16 has internal threading complementary of the external threading 13 to facilitate this colinear movement (along a shared longitudinal axis 15 of the first and second adjustor portions 12 and 16.

A locking element 18 may operatively associated with both the first and second adjustor portions 12 and 16 for transitioning the second adjustor portion 16 between locked and unlocked engagements relative to the track adaptor 10, wherein in the locked engagement the second adjustor portion 16 is prevented from moving vertically relative to the first adjustor portion 12.

The locking element 18 may be a lock nut and, as mentioned above, may be disposed downward of the second adjustor portion 16, wherein the directional term 'downward' (or 'bottom', 'lower' or the like) are understood best in reference to FIGS. 1 and 2, wherein downward is directed to the bottom margin of those Figures. A multi-positional cap 20 may disposed upward of the second adjustor portion 16.

Figure 3:
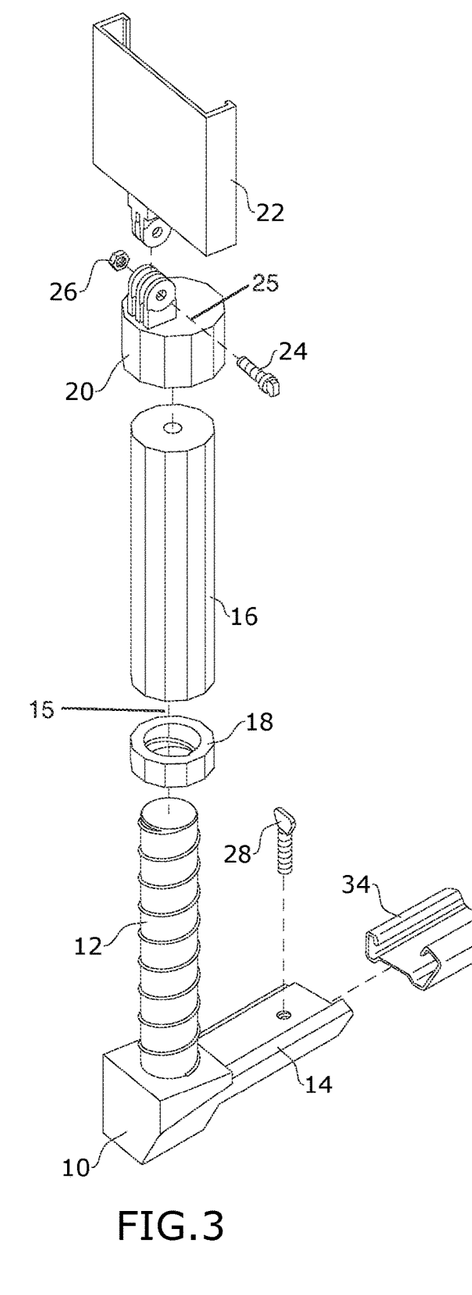
FIG. 3 is an exploded perspective view of an exemplary embodiment of the present invention, illustrating orthogonal axis of rotation and extension.

The multi-positional cap 20 provides an object retainer 22 by way of a pivotable connection 24. The pivotable connection 24 enables the object retainer 22 to pivot about an axis 25 orthogonal relative to the shared longitudinal axis 15 of the first and second adjustor portions 12 and 16, as illustrated in FIG. 3. The object retainer 22 may be dimensioned and adapted to slidably receive a smart device 38, such as but not limited to a mobile phone, navigation device, video camera or the like.

The device sleeve 22 may be connected to the pivotable connection 24 by way of one or more locking fasteners 26, wherein the locking fasteners 26 can position the object retainer 22 between an unlocked position and a locked position, preventing pivoting. The pivotable connection 24 could be a hinge or any other type of pivotable connection.

In certain embodiments, the multi-positional cap 20 can be replaced by a container holder cap 30. The container holder cap 30 engages an upper portion of the second adjustor portion 16 and provides a container sleeve 31 for slidably storing a cylindrical or tapered cylindrical containers 40, frequently used to hold beverages. The container sleeve 31 may have a plurality of apertures 33 for manufacturing purposes.

Figure 6:
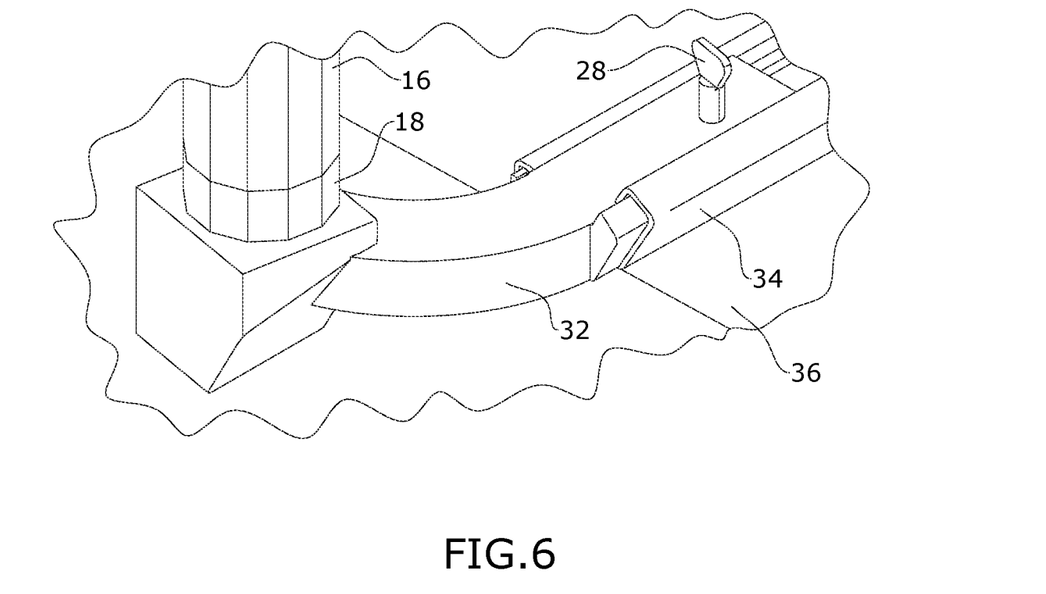
FIG. 6 is a detailed perspective view of an exemplary embodiment of the present invention, illustrating an offset track arm.
Figure 7:
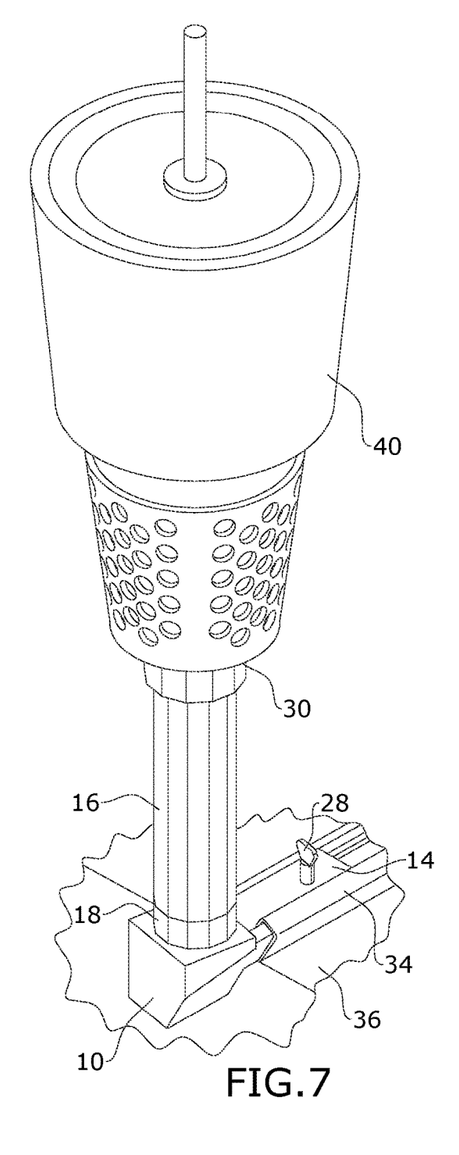
FIG. 7 is a perspective view of an exemplary embodiment of the present invention in a container configuration, shown in a used condition
Figure 8:
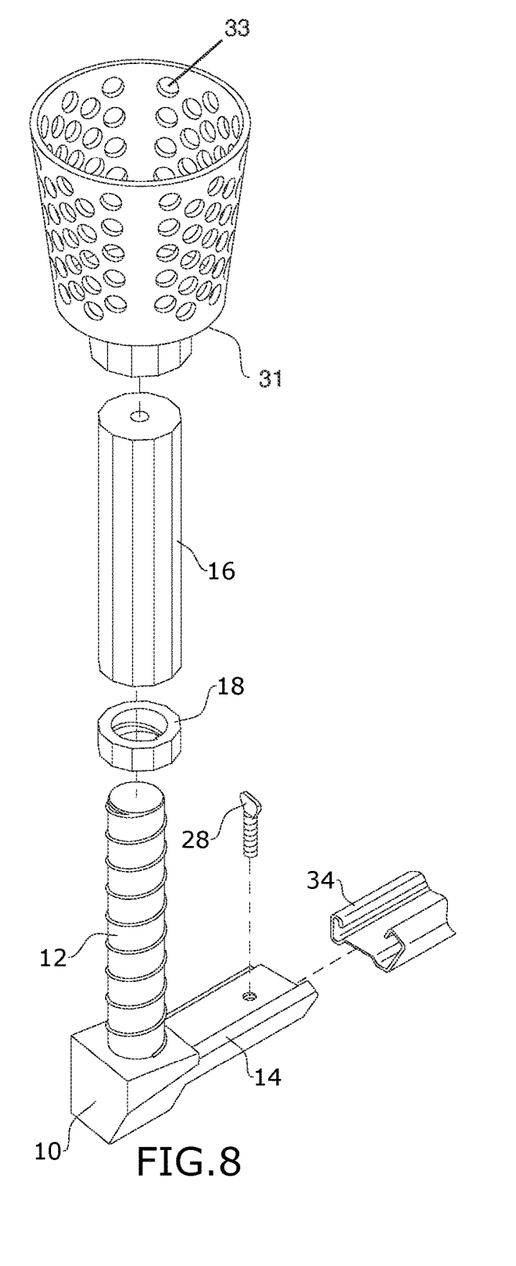
FIG. 8 is an exploded perspective view of an exemplary embodiment of the present invention.
Figure 9:
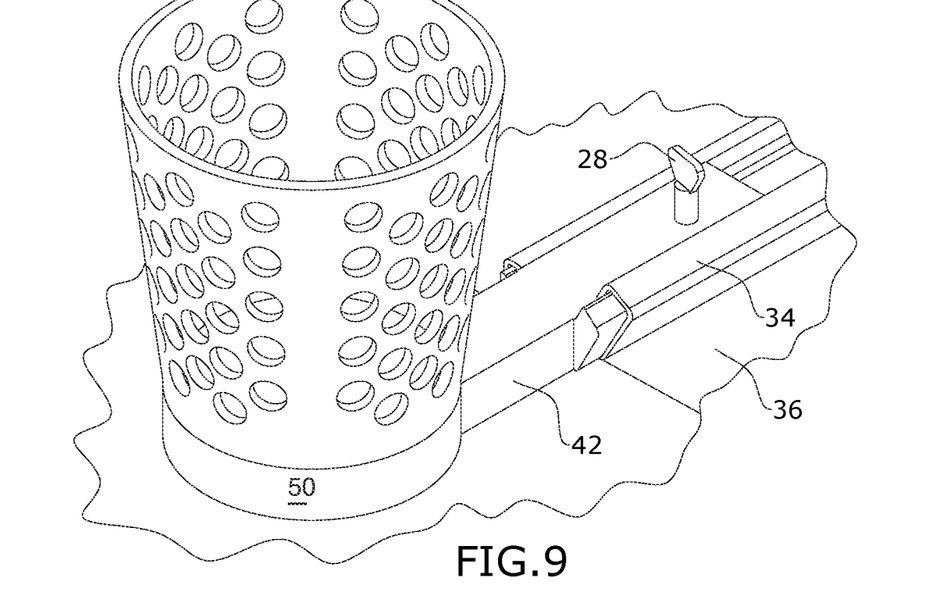
FIG. 9 is a perspective view of an exemplary embodiment of the present invention in an alternative container configuration.
Figure 10:
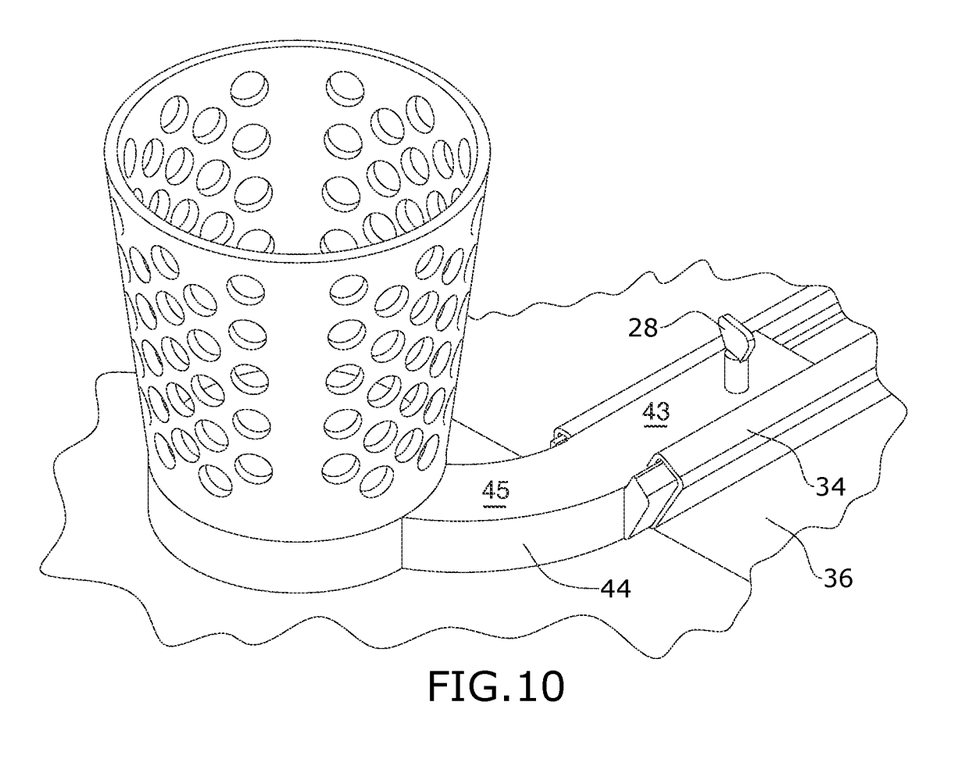
FIG. 10 is a perspective view of an exemplary embodiment of the present invention, illustrating an offset track arm.

In certain embodiments, the container configuration (nor the device configuration) may not include the first adjustor portion 12, the second adjustor portion 16, the locking element 18, the multi-positional cap 20, the container holder cap 30, but rather the track adaptor 10 could comprise mostly of the container sleeve 31 (or the object retainer 22) and the track arm 42/44. The track arm could be a straight track arm 42 or an offset track arm 44. The offset track arm 44 would have a straight portion 43 for engaging the seat track 34 but thereafter the remainder of the offset track arm 44 would be non-linear (relative to the straight portion 43). The offset track arm 44 may have an arcuate portion 45. The arcuate portion 45 may have a curvature extending from a proximal end (interfacing the straight portion 43) to a distal end interfacing with a base 50 that supports the container sleeve 31 (or the object retainer 22). The curvature may extend up to approximately two radians and have a length sufficient so that the distal end terminates beyond the profile of the straight portion 43. In other words, if the curvature curves to the right (though in some embodiments, the curvature may be to the left, downward, or upward), then the rightmost edge of the straight portion 43 intersects the curved portion 45 prior to the distal end of the offset track arm 44. Moreover, the earlier embodiments may also employ an offset track arm 32, as illustrated in FIG. 6.

A method of using the present invention may include the following. The object retaining system 100 disclosed above may be provided. A user may fit the track arm into the seat runner/track 34 of the host vehicle. The optional locking mechanism 28 (in some but not all embodiments may include a thumb screw passing through a threaded hole in the body of the track arm, wherein the thumb screw engages the seat runner) prevents unintentional movement or removal of the object retaining system 100. In certain embodiments, the container/device sleeve is elevated from the seat runner arm using the first and second adjustor portions, wherein in some embodiments, a screw column and locknut are used to selectively adjust and set the height. The container/device sleeve can be rotated about the vertical axis by lifting the cap (20 or 30) off and rotating the cap 20/30, and then place the cap 20/30 over the top of the vertical column of the second adjustor portion 16. In some configurations, the inclination can be changed by loosening the pivotable connection fastener rotating the sleeve about the horizontal pivot defined by the pivotable connection and then tightening the locking fastener. Any commercially available device holder or container holder may be used to secure the device or container, respectively. Alternate mechanisms to adjust the height and rotational position of the beverage/device holder may be employed. The screw mechanism shown in the Figures is an example only.

In its simplest form, the beverage/device holder arm is inserted into/around the seat runner, slid as far as needed. The beverage/device holder is then available for use. The height of the second adjustor portion 16 is adjusted (in the example case via the screw mechanism), selectively adjusting the elevation of the beverage/device holder orientation, which is then secured in place through tightening of the optional lock nut or equivalent into a locked engagement. The present invention is then ready for use. Removal of the devices is achieved by unlocking the locking mechanism and sliding the track arm forward and out of the seat runner.

The disclosure could be made by measuring the geometry of the seat runner in the target vehicle and using this as the cross-section of the arm. The base and arm would then be configured to suit the available space of the target vehicle. The upper part for a beverage holder or a mobile device holder would be selected from available designs and a mechanism for the height adjustment may optionally be included. With the design complete the component parts can be manufactured by suitable processes such as injection molding, three-dimensional printing, etc., and assembled.

The critical element is the custom arm designed to fit into/around the seat runner of the target vehicle (or range of vehicles). The base design should permit insertion and removal of the arm from the seat runner (for example, in some vehicles, the gearbox or transmission tunnel requires curving or slanting of the track arm, thus the offset track arms 32/42. The locking mechanism is optional but improves the security of the apparatus.

As used in this application, the term "about" or "approximately" may refer to a range of values within plus or minus 10% of the specified number. And the term "substantially" refers to up to 90% or more of an entirety, and/or the terms "about" and "approximately" are to be construed as indicating a deviation as would be appreciated by one of ordinary skill in the art to operate satisfactorily for an intended purpose. Recitation of ranges of values herein are not intended to be limiting, referring instead individually to any and all values falling within the range, unless otherwise indicated, and each separate value within such a range is incorporated into the specification as if it were individually recited herein. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. An object retaining system for an interior of a vehicle, the vehicle comprising a plurality of seat tracks, the system comprising:
   a track adaptor for engaging only a candidate seat track of the plurality of seat tracks, wherein the candidate seat track consists of a single seat track, the track adaptor comprising:
      a track arm comprising:
         a proximal end slidably engaging opposing rails of the candidate seat tracks;
         a distal end; and
         a locking mechanism entirely disposed between the opposing rail sidewalls, wherein the locking mechanism engages a base of the single track; and
      a base connected to the distal end, wherein the base is generally centered between said opposing rails of a single track, wherein the base supports retention of an object.

2. The system of claim 1, wherein the track arm extends in a first plane and the object is supported in a second plane, wherein the first and second planes are out of plane.

3. The system of claim 2, wherein the first and second plane are approximately orthogonal relative to each other.

4. The system of claim 1, further comprising an elevation adjustor extending from the base in an elevation direction approximately orthogonal relative to a track direction of a proximal end of the track arm, wherein the elevation adjustor is selectively movable between a retracted position and an extended position in the elevation direction.

5. The system of claim 4, wherein the elevation adjustor comprises a first adjustor portion and a second adjustor portion having external threading and internal threading, respectively, so that the second adjustor portion is selectively movable in the elevation direction relative to the first adjustor portion.

6. The system of claim 4, further comprising a locking element to position the elevation adjustor between an unlocked position and a locked position, preventing movement in the elevation direction.

7. The system of claim 4, further comprising a cap dimensioned to operatively associated with an upper portion of the elevation adjustor in such a way that the cap can be rotated about a longitudinal axis of the elevation adjustor.

8. The system of claim 7, further comprising a pivotable connection along the cap, wherein the pivotable connection is pivotable about an axis of rotation orthogonal to said longitudinal axis.

9. The system of claim 8, further comprising an object retainer associated with the pivotable connection, wherein the object retainer is dimensioned to support retention of said object.

10. The system of claim 1, further comprising an object retainer associated with the base, wherein the object retainer is dimensioned and adapted for the retention of said object.

11. The system of claim 9, wherein the object retainer is a sleeve dimensioned to retain a computing device.

12. The system of claim 9, wherein the object retainer is a sleeve dimensioned to retain a tapered cylindrical object.

13. The system of claim 12, wherein the object retainer is the sleeve has a plurality of holes.

14. The system of claim 1, further comprising a rail protrusion on each side of the proximal end of the track arm, wherein each rail protrusion is slidably engaging each rail of the opposing rails.

15. An object retaining system for an interior of a vehicle, the vehicle comprising a plurality of seat tracks, the system comprising:
   a track adaptor for engaging only a candidate seat track of the plurality of seat tracks, wherein the candidate seat track consists of a single seat track, the track adaptor comprising:
      a track arm comprising:
         a linear portion dimensioned to slidably engage opposing rails of the candidate seat tracks; and
         an arcuate portion, wherein the arcuate portion has a curvature defined by a range of one to two radians;
      a base connected to a distal end of the arcuate portion, wherein the base supports retention of an object.

16. The system of claim 14, wherein the distal end of the arcuate portion terminates just beyond a silhouette profile of the candidate seat track.

17. The system of claim 15, wherein the linear and arcuate portions define a unitary construction.

18. An object retaining system for an interior of a vehicle, the vehicle comprising a plurality of seat tracks, the system comprising:
   a track adaptor for engaging only a candidate seat track of the plurality of seat tracks, wherein the candidate seat track consists of a single seat track, the track adaptor comprising:
      a track arm consisting:
         a linear portion dimensioned to slidably engage opposing rails of the candidate seat tracks; and
         an arcuate portion, wherein the arcuate portion has a curvature defined by a range of one to two radians;
      a base connected to a distal end of the arcuate portion, wherein the base supports retention of an object.

19. The system of claim 18, wherein the distal end of the arcuate portion terminates just beyond a silhouette profile of the candidate seat track.

20. The system of claim 19, wherein the linear and arcuate portions define a unitary construction.

\* \* \* \* \*